(12) United States Patent
Polak et al.

(10) Patent No.: US 8,957,863 B2
(45) Date of Patent: Feb. 17, 2015

(54) COLORED MORPHING APPARATUS FOR AN ELECTRONIC DEVICE

(75) Inventors: Robert D. Polak, Lindenhurst, IL (US);
David M. Emig, Trenton, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 526 days.

(21) Appl. No.: 12/470,957

(22) Filed: May 22, 2009

(65) Prior Publication Data

US 2009/0225057 A1   Sep. 10, 2009

Related U.S. Application Data

(62) Division of application No. 11/766,921, filed on Jun. 22, 2007.

(51) Int. Cl.
*G02F 1/1335* (2006.01)
*G06F 3/02* (2006.01)
(Continued)

(52) U.S. Cl.
CPC .... *G02F 1/133536* (2013.01); *G02F 1/133533* (2013.01); *G06F 3/0219* (2013.01); *G06F 3/0238* (2013.01); *H01H 13/83* (2013.01); *H04M 1/22* (2013.01); *H04M 1/23* (2013.01); *H04M 1/7258* (2013.01); *G02F 1/13338* (2013.01); *G02F 1/133602* (2013.01); *G02F 1/134327* (2013.01); *G02F 1/13471* (2013.01); *G02F 2001/133567* (2013.01); *G02F 2201/44* (2013.01); *H01H 2219/002* (2013.01);
(Continued)

(58) Field of Classification Search
CPC ............. G02F 1/134327; G02F 1/133533; G02F 1/1692; H04M 1/22

USPC ................... 345/168–170, 173; 349/96–108
See application file for complete search history.

(56) References Cited

U.S. PATENT DOCUMENTS

| | | | |
|---|---|---|---|
| 3,915,548 A | 10/1975 | Opittek et al. | |
| 4,017,848 A | 4/1977 | Tannas, Jr. | |

(Continued)

FOREIGN PATENT DOCUMENTS

| | | |
|---|---|---|
| EP | 1341029 | 9/2003 |
| EP | 1467536 | 10/2004 |

(Continued)

OTHER PUBLICATIONS

Joseph, Dennis "Final Office Action", U.S. Appl. No. 11/679,233, filed Feb. 27, 2007, Adam Cybart et al., inventors, Mailed Apr. 29, 2010.

(Continued)

*Primary Examiner* — Allison Johnson (57) ABSTRACT

A user interface (200) for a portable electronic device (100) is configured to transition from a first state to a second state to present a plurality of mode-based user actuation targets to a user. The user interface (200) includes a segmented electro-optical device (407) configured to open and close shutters, thereby revealing and hiding the user actuation targets. The user interface includes a first polarizer (401) disposed above the segmented electro-optical device (407) and a colored reflective polarizer (405) disposed beneath the segmented electro-optical device. The colored reflective polarizer (405), which may include a colored dichroic polarizer (601) and a reflective polarizer (602), causes the user interface (200) to exhibit a predetermined color.

20 Claims, 8 Drawing Sheets

(51) Int. Cl.
   *G06F 3/023*     (2006.01)
   *H01H 13/83*    (2006.01)
   *H04M 1/22*     (2006.01)
   *H04M 1/23*     (2006.01)
   *H04M 1/725*    (2006.01)
   *G02F 1/1333*   (2006.01)
   *G02F 1/1343*   (2006.01)
   *G02F 1/1347*   (2006.01)

(52) U.S. Cl.
   CPC .... *H01H2219/054* (2013.01); *H01H 2219/058* (2013.01); *H04M 1/72522* (2013.01); *H04M 2250/22* (2013.01)
   USPC .......................................... 345/170; 349/97

(56) References Cited

U.S. PATENT DOCUMENTS

| | | | |
|---|---|---|---|
| 4,078,257 A | 3/1978 | Bagley | |
| 4,462,924 A | 7/1984 | Raynes | |
| 4,500,173 A | 2/1985 | Leibowitz et al. | |
| 4,545,648 A | 10/1985 | Shulman et al. | |
| 4,728,936 A | 3/1988 | Guscott et al. | |
| 4,893,903 A | 1/1990 | Thakar et al. | |
| 5,121,234 A | 6/1992 | Kucera | |
| 5,225,818 A | 7/1993 | Lee et al. | |
| 5,231,381 A | 7/1993 | Duwaer | |
| 5,376,948 A | 12/1994 | Roberts | |
| 5,600,459 A | 2/1997 | Roy et al. | |
| 5,796,454 A | 8/1998 | Ma | |
| 5,818,615 A | 10/1998 | Abileah et al. | |
| 6,047,196 A | 4/2000 | Mäkelä et al. | |
| 6,058,164 A | 5/2000 | Ibuka et al. | |
| 6,144,359 A | 11/2000 | Grave | |
| 6,150,962 A | 11/2000 | Rossmann | |
| 6,188,379 B1 | 2/2001 | Kaneko | |
| 6,211,931 B1 | 4/2001 | Fukao et al. | |
| 6,243,080 B1 | 6/2001 | Molne | |
| 6,271,835 B1 | 8/2001 | Hoeksma | |
| 6,310,609 B1 | 10/2001 | Morgenthaler | |
| 6,325,424 B1 | 12/2001 | Metcalfe | |
| 6,327,376 B1 | 12/2001 | Harkin | |
| 6,574,044 B1 | 6/2003 | Sahouani et al. | |
| 6,574,487 B1 | 6/2003 | Smith et al. | |
| 6,646,697 B1 | 11/2003 | Sekiguchi et al. | |
| 6,662,244 B1 | 12/2003 | Takahashi | |
| 6,704,004 B1 | 3/2004 | Ostergård et al. | |
| 6,768,481 B2 | 7/2004 | Ozawa et al. | |
| 6,768,586 B2 | 7/2004 | Sahouani et al. | |
| 6,813,957 B1 | 11/2004 | Platz | |
| 6,819,316 B2 | 11/2004 | Schultz et al. | |
| 6,819,380 B2 | 11/2004 | Wen et al. | |
| 6,842,170 B1 | 1/2005 | Akins et al. | |
| 6,914,874 B2 | 11/2005 | Silverbrook et al. | |
| 6,968,744 B1 | 11/2005 | Silverbrook et al. | |
| 7,106,517 B2 | 9/2006 | Olczak | |
| 7,123,945 B2 | 10/2006 | Kokubo | |
| 7,127,705 B2 | 10/2006 | Christfort | |
| 7,139,114 B2 | 11/2006 | Schmitz et al. | |
| 7,180,672 B2 | 2/2007 | Olczak | |
| 7,191,150 B1 | 3/2007 | Shao et al. | |
| 7,345,671 B2 | 3/2008 | Robbin et al. | |
| 2002/0090980 A1 | 7/2002 | Wilcox et al. | |
| 2002/0123946 A1 | 9/2002 | Haworth et al. | |
| 2002/0123962 A1 | 9/2002 | Bryman et al. | |
| 2003/0020999 A1 | 1/2003 | Tsujimura et al. | |
| 2003/0025679 A1 | 2/2003 | Taylor et al. | |
| 2003/0054867 A1 | 3/2003 | Dowlat et al. | |
| 2003/0058223 A1 | 3/2003 | Tracy et al. | |
| 2003/0161093 A1 | 8/2003 | Lam et al. | |
| 2004/0036680 A1 | 2/2004 | Davis et al. | |
| 2004/0058718 A1 | 3/2004 | Yu | |
| 2004/0073504 A1 | 4/2004 | Bryman et al. | |
| 2004/0092196 A1* | 5/2004 | Van De Witte et al. ......... 445/24 |
| 2004/0104826 A1 | 6/2004 | Philipp | |
| 2004/0189591 A1 | 9/2004 | du Breuil | |
| 2004/0218121 A1 | 11/2004 | Zhuang et al. | |
| 2004/0246580 A1 | 12/2004 | Shahouani et al. | |
| 2004/0265602 A1 | 12/2004 | Kobayashi et al. | |
| 2005/0007339 A1 | 1/2005 | Sato | |
| 2005/0020316 A1 | 1/2005 | Mahini | |
| 2005/0020325 A1 | 1/2005 | Enger et al. | |
| 2005/0030048 A1 | 2/2005 | Bolender et al. | |
| 2005/0030292 A1 | 2/2005 | Diederiks | |
| 2005/0064913 A1 | 3/2005 | Kim | |
| 2005/0088417 A1 | 4/2005 | Mulligan | |
| 2005/0093767 A1 | 5/2005 | Lu et al. | |
| 2005/0114825 A1 | 5/2005 | Leung et al. | |
| 2005/0134549 A1 | 6/2005 | Kamiya et al. | |
| 2005/0171901 A1 | 8/2005 | Rosenblatt et al. | |
| 2005/0243069 A1 | 11/2005 | Yorio et al. | |
| 2005/0264190 A1 | 12/2005 | Park et al. | |
| 2005/0266891 A1 | 12/2005 | Mullen | |
| 2006/0038937 A1 | 2/2006 | Kaneko et al. | |
| 2006/0046792 A1 | 3/2006 | Hassemer et al. | |
| 2006/0080236 A1 | 4/2006 | Welker et al. | |
| 2006/0146012 A1 | 7/2006 | Arneson et al. | |
| 2006/0161870 A1 | 7/2006 | Hotelling et al. | |
| 2006/0161871 A1 | 7/2006 | Hotelling et al. | |
| 2006/0166702 A1 | 7/2006 | Dietz et al. | |
| 2006/0197753 A1 | 9/2006 | Hotelling | |
| 2006/0266640 A1 | 11/2006 | Halsey et al. | |
| 2006/0277472 A1 | 12/2006 | Yodo et al. | |
| 2006/0277478 A1 | 12/2006 | Seraji et al. | |
| 2006/0290871 A1 | 12/2006 | Harada | |
| 2007/0030438 A1 | 2/2007 | Chiang | |
| 2007/0052689 A1 | 3/2007 | Takahashi | |
| 2007/0075965 A1 | 4/2007 | Huppi et al. | |
| 2007/0097595 A1 | 5/2007 | Radivojevic et al. | |
| 2007/0152983 A1 | 7/2007 | McKillop et al. | |
| 2007/0164986 A1 | 7/2007 | Jeong et al. | |
| 2007/0273662 A1 | 11/2007 | Lian et al. | |
| 2008/0122796 A1 | 5/2008 | Jobs et al. | |
| 2008/0169944 A1 | 7/2008 | Howarth et al. | |
| 2008/0204417 A1 | 8/2008 | Pierce et al. | |
| 2008/0211734 A1 | 9/2008 | Huitema et al. | |
| 2008/0309589 A1 | 12/2008 | Morales | |

FOREIGN PATENT DOCUMENTS

| | | |
|---|---|---|
| GB | 2348039 | 9/2000 |
| GB | 2359178 | 8/2001 |
| JP | 2002-049461 | 2/1990 |
| JP | 03-180920 | 8/1991 |
| JP | 08-063271 | 3/1996 |
| JP | 2003-101622 | 4/2003 |
| JP | 2005-100186 | 4/2005 |
| JP | 2005352987 | 12/2005 |
| JP | 2006-091486 A | 4/2006 |
| JP | 2006-243658 A | 9/2006 |
| JP | 2006-2874757 A | 10/2006 |
| KR | 10-1998-0026397 | 7/1998 |
| KR | 20-0225646 | 6/2001 |
| KR | 10-2004-0019677 | 3/2004 |
| KR | 100652767 | 11/2006 |
| KR | 10-2006-0134659 | 12/2006 |
| KR | 10-2007-0109603 | 11/2007 |
| WO | WO-01/13209 | 2/2001 |
| WO | WO 02/31807 | 4/2002 |
| WO | WO-03-104884 | 12/2003 |
| WO | WO-2006/094308 | 9/2006 |
| WO | WO-2006/116145 | 11/2006 |
| WO | WO-2006/123294 | 11/2006 |
| WO | WO 2007/063809 A1 | 6/2007 |

OTHER PUBLICATIONS

Moorad, Waseem "Non-Final Office Action", U.S. Appl. No. 11/751,175, filed May 21, 2007, David S. Brenner, inventor, Mailed May 19, 2010.

Hegarty, Kelly B., "Non-Final Office Action", U.S. Appl. No. 11/762,481, filed Jun. 13, 2007, Joseph M. Morales, inventor, Mailed May 14, 2010.

(56) References Cited

OTHER PUBLICATIONS

Walthall, Allison N., "Final Office Action", U.S. Appl. No. 11/766,921, filed Jun. 22, 2007, Robert D. Polak, inventor, Mailed May 18, 2010.
Tsvey, Gennadiy "Final Office Action", U.S. Appl. No. 11/684,476, filed Mar. 9, 2007, Paul M. Pierce, inventor, Mailed May 25, 2010.
Sitta, Grant "Final Office Action", U.S. Appl. No. 11/741,877, filed Apr. 30, 2010, XiaoPing Bai first inventor, Mailed Jun. 2, 2010.
Tsvey, Gennadiy "Final Office Action", U.S. Appl. No. 11/684,454, filed Mar. 9, 2007, Paul M. Pierce, first inventor, Mailed May 28, 2010.
Marinelli, Patrick "Non-Final Office Action", U.S. Appl. No. 11/836,973, filed Aug. 10, 2007, Paul M. Pierce, first inventor, Mailed Aug. 17, 2010.
Sony Operation Guide, Publication Date Unknown.
Hegarty, Kelly "Final Office Action", U.S. Appl. No. 11/762,481, filed Jun. 13, 2007, Joseph M. Morales, first inventor, Mailed Oct. 13, 2010.
Schnirel, Andrew "Final Office Action", U.S. Appl. No. 11/679,228, filed Feb. 27, 2007, Adam Cybart, first inventor, Mailed Oct. 28, 2010.
Edwards, Carolyn R., "First Office Action", First inventor: Paul Pierce Filing Date: Aug. 9, 2007 U.S. Appl. No. 11/836,616 Mail date: Nov. 23, 2010.
Moorad, Waseem "Final Office Action", U.S. Appl. No. 11/751,175, filed May 21, 2010, Mailed Dec. 9, 2010.
Schneider, Michael "PCT Search Report and Opinion", Date of search: May 3, 2010 Date mailed: May 11, 2010 Filed: 08728978.1-2224/211555CS31966DE.EPC.C.
Joseph, Dennis P., et al., "Non-Final Office Action", U.S. Appl. No. 11/679,233, filed Feb. 27, 2007 First Inventor: Adam Cybart Mailed: Feb. 2, 2011, 1 and 3-13 rejected for obviousness.
""Palm Treo 650 Cell Phone" (Lets Talk catalog web site as of 2006)", http://web.archive.org/web/20060313154345/www.letstalk.com/product/product.htm?prid=27762, 2006.
Tsvey, Gennadiy "Non-Final Office Action", U.S. Appl. No. 11/684,454, mailed Nov. 9, 2009.
Tsvey, Gennadiy "Non-Final Office Action", U.S. Appl. No. 11/684,476, mailed Oct. 9, 2009.
Joseph, Dennis P., "Non-Final Office Action Mailed Nov. 13, 2009", U.S. Appl. No. 11/679,233, filed Feb. 27, 2007, First Inventor Adam Cybart.
Walthall, Allison N., "Non-Final Office Action", U.S. Appl. No. 11/766,921, filed Jun. 22, 2007, Mailed Jan. 27, 2010.
Schnirel, Andrew B., "Non-Final Office Action", U.S. Appl. No. 11/679,228, filed Feb. 27, 2007, Adam Cybart, inventor, Mailed Mar. 10, 2010.
Banarjea, Robin "PCT Search Report and Opinion", PCT application: PCT/US2008/071674; International Filing Date: Jul. 31, 2008; Applicant: Motorola, Inc.; Date of mailing: Jan. 4, 2011; Priority date: Aug. 10, 2007.
Qi, Zhi Q., "Notice of Allowance", U.S. Appl. No. 11/838,061, filed Aug. 13, 2007, mailed Apr. 11, 2011.
Hegarty, Kelly "Non-Final Office Action", U.S. Appl. No. 11/762,481, filed Jun. 13, 2007.
"Wikipedia—Liquid Crystal Display—Website", Wikipedia: Liquid Crystal Display; Printed Aug. 9, 2007.
"Website", Engadget.com—Pioneer; Printed Aug. 9, 2007.
"Website", Apple Website; Printed Aug. 9, 2007.
"Website", Mobiledia Website; Printed Aug. 9, 2007.
Nguyen, Dung T., "Non-Final Office Action", U.S. Appl. No. 11/959,999, filed Dec. 19, 2007, mailed Aug. 4, 2011.
Qi, Zhi Q., "Notice of Allowance", U.S. Appl. No. 11/838,061, filed Aug. 13, 2007, mailed Aug. 9, 2011.
Marinell, Patrick "Examiner's Answer", U.S. Appl. No. 11/836,973; filed Aug. 10, 2007; Mailed Nov. 17, 2011.
Nguyen, Dung T., "Notice of Allowance", U.S. Appl. No. 11/959,999; filed Dec. 19, 2007; Mailed Dec. 23, 2011.
Walthall, Allison N., "Final Office Action", U.S. Appl. No. 12/470,792; filed May 22, 2009; Mailed Apr. 18, 2012.
Walthall, Allison N., U.S. Appl. No. 12/470,792; filed May 22, 2009; Mailed Nov. 13, 2012.
"PTAB Decision", U.S. Appl. No. 11/005,212; filed Jun. 22, 2007; Mailed Oct. 25, 2013.

* cited by examiner

COLORED MORPHING APPARATUS FOR AN ELECTRONIC DEVICE

CROSS REFERENCE TO RELATED APPLICATIONS

This application is a divisional application from, and claims priority under 35 USC §121 to, U.S. Ser. No. 11/766,921, filed Jun. 22, 2007, entitled "Colored Morphing Apparatus for an Electronic Device."

BACKGROUND

1. Technical Field

This invention relates generally to a morphing user interface for an electronic device capable of selectively revealing and hiding one of a plurality of keypad configurations to a user, and more specifically to a device and method for configuring the light reflective properties of such a morphing user interface.

2. Background Art

Portable electronic devices, such as radiotelephones, are becoming more and more popular. According to some estimates, over two billion mobile telephones are in use across the world today. As more people come to use mobile devices, designers and engineers are creating devices that integrate more and more features. For instance, many mobile telephones today also include digital camera functions and text messaging functions. Some even include music playback functions.

One issue associated with the integration of new features and functionality with devices like mobile telephones involves the user interface. Traditional mobile telephones only included twelve to fifteen keys. These keys included the standard 12-digit telephone keypad, along with a "send" key and an "end" key. Such devices are sometimes not compatible with new features and functions as new modes of operation require new, dedicated keys or input devices in addition to the basic phone keys. Further, the devices may also require additional keys for the purpose of navigation or initiation of the modes within the device.

One solution to the need for more keys in the user interface is to simply add more buttons to the device. Some devices, for example, include full keypads with forty to fifty keys. The problem with this solution is that many mobile devices, including mobile telephones, are getting smaller and thinner. When many keys are clustered in one location, the likelihood of user confusion or difficulty with operation of the device increases. What's more, in a particular mode, many of the keys are not needed. For example, when a device is in a camera mode, the number keys 1-9 are generally not needed to take pictures.

Commonly assigned, co-pending U.S. patent application Ser. No. 11/684,454, filed Mar. 9, 2007, entitled "Multimodal Adaptive User Interface for a Portable Electronic Device," and Ser. No. 11/679,228, filed Feb. 27, 2007, entitled "Adaptable User Interface and Mechanism for a Portable Electronic Device" each teach a method and apparatus for providing a portable electronic device that hides and reveals various keypad configurations to a user by way of an optical shutter. The optical shutter is configured to selectively open and close shutter segments by the application of an electric field, thereby hiding and revealing user actuation targets.

One issue with such a solution is that the color of the device, when the optical shutter is off, is largely dictated by the construction of the of the display system. For example, in on embodiment where standard polarizers are used about the optical shutter, the color seen when the optical shutter is closed may be either grey or black. However, some manufacturers prefer to make their devices fashionable as well as functional. Such manufacturers would prefer to be able to specify an overall device color that is visible by the user.

There is thus a need for an improved morphing display capable of reflecting a predetermined color.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

The commonly assigned, copending patent applications, application Ser. Nos. 11/684,454 and 11/679,228, teach an electronic device having a morphing display capable of hiding and revealing various keypad interfaces. The keypad interfaces each comprise a plurality of user actuation targets. In some embodiments, the keypad configurations are associated with a particular mode of operation of the device. Further, the user actuation targets presented may be limited to only those needed for the particular mode of operation, thereby reducing user cognitive loading.

The morphing keypad performs the hiding and revealing function by opening and closing shutters in an optical shutter element. This optical shutter element functions as a segmented electro-optical device in that it selectively alters an axis of polarization of light passing through the keypad. When the electro-optical device is used in conjunction with light polarization layers, the alteration of the axis of polarization causes predetermined shutters to "open" or "close".

Traditional light polarization layers do two things: First, they absorb light polarized along a first axis of polarization. Second, they transmit light polarized along a second axis of polarization. While some small amount of light polarized along the first axis may be reflected, the majority of such light is absorbed by the polarizer. These polarizers are therefore generally grey or black in appearance when absorbing light. Thus, in an electronic device as taught in the Ser. No. 11/684,454 and Ser. No. 11/679,228 applications, when the user actuation elements are not present, the face of the device may be black or grey in appearance.

Embodiments of the present invention employ a colored reflective polarizer that is configured to reflect a predetermined color of light polarized along a first axis, and to absorb other colors. Each "color", as used herein, is simply a predetermined spectrum of visible light. For instance, a "blue" color may be visible light having a wavelength of between 450 and 495 nanometers. The colored reflective polarizer of the present invention is configured to reflect the predetermined color and absorb other wavelengths, thereby causing the morphing display to appear a particular color when either the shutters are closed or the device is off. The colored reflective polarizer described herein transmits neutral light polarized along the second axis, similar to traditional polarizers.

Figure 1:
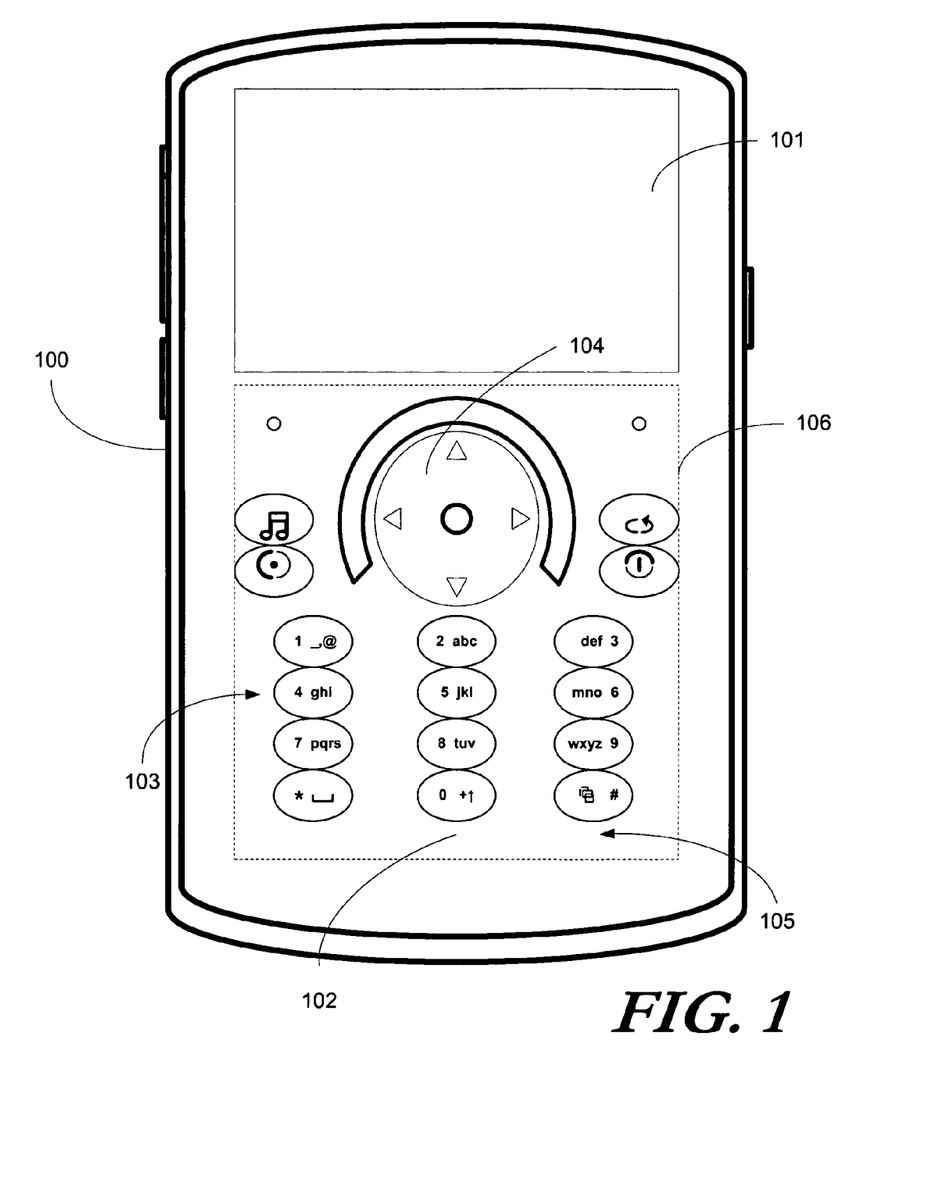
FIG. 1 illustrates one embodiment of an electronic device in accordance with the invention.

The colored reflective polarizer is used in conjunction with the morphing display. Turning now to FIG. 1, illustrated therein is portable electronic device 100 comprising a high-resolution display 101 and a segmented electro-optical display 102. The segmented electro-optical display 102 is configured as an optical shutter to present a mode-based dynamic keypad 103 to a user. The mode-based dynamic keypad 103 is one of a plurality of keypad configurations, and is associated with the current mode of operation of the electronic device 100. The mode-based dynamic keypad 103, and its keypad configuration, may include only those keys necessary for navigating the particular operating mode of the device.

In addition to the high-resolution display 101 and the segmented electro-optical display 102, the exemplary electronic device 100 shown in FIG. 1 also includes a navigation device 104. The navigation device 104 is used for selectively navigating between the various modes of the device. The navigation device 104 may also be used as a control for each operational mode. The navigation device 104 may be continually accessible to the user. Alternatively, the navigation device may be selectively hidden and revealed by the segmented electro-optical display 102. The navigation device 104 is disposed—in the embodiment of FIG. 1.—in the keypad region 106 of the electronic device 100. This geometric location allows the navigation device 104 to be large and easily accessible.

The high-resolution display 101 comprises a liquid crystal display (LCD) configured to present device information to the user. The term "high-resolution display 101" is used herein to refer to a device that can present text and images to a user by altering a large number of pixels which, when viewed collectively by a user, form the presented text or image. The term "high resolution" is used herein to mean a display suitable for the presentation of text, information, and graphics on a mobile device with sufficient granularity as to be easily switched between graphics or text. For example, the high-resolution display would be one suitable for presenting an image in the Joint Photographics Expert Group (JPG) format to the user. Such displays generally are configured to turn on and off individual pixels by way of a display driver for the presentation of high-resolution information. Examples include a 256-pixel by 128-pixel reflective or backlit LCD. Such display devices are manufactured by Samsung and Sony.

The front surface 105 of the electronic device 100 forms the overall user interface. In the keypad region 106, the segmented electro-optical display 102 provides a dynamic user input interface. This dynamic user interface is configured to present different indicators, which may appear as keys or actuation targets, across the user interface in the keypad region 106.

Figure 2:
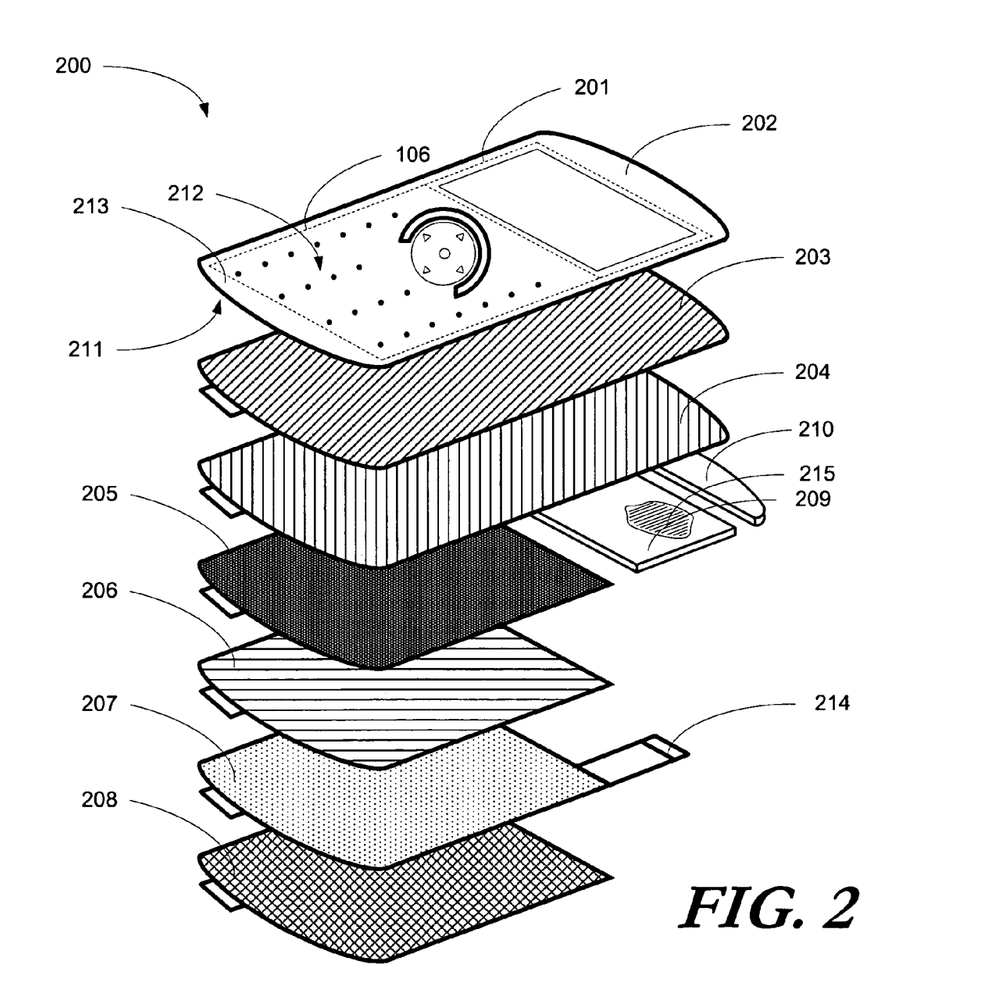
FIG. 2 illustrates an exploded view of one embodiment of a dynamic keypad interface in accordance with the invention.

Turning now to FIG. 2, illustrated therein is an exploded view of a dynamic user interface 200 for a portable electronic device (100) in accordance with one embodiment of the invention. The user interface 200 includes a dynamic keypad region 106 and a display region 201 (the display region 201 is generally atop the high-resolution display 209). The user interface 200 is made from several layers, each layer implementing a different function. While several layers are shown, it will be clear to those of ordinary skill in the art having the benefit of this disclosure that each and every layer may not be required for a specific application. The structure of FIG. 2 is exemplary only.

The user interface 200 of FIG. 2 includes the following components: a cover layer 202; a capacitive sensor 203; an optical shutter assembly 204; a reflective electroluminescent device 205, a resistive switch layer 206; a substrate layer 207; and a tactile feedback layer 208. Additionally, a high-resolution display 209 and filler materials 210 may be included to complete the assembly. While the layers are shown individually, it will be clear to those of ordinary skill in the art having the benefit of this disclosure that some of the various layers may be combined together. For instance, the cover layer 202 and capacitive sensor 203 may be integrated together to form a single layer. Similarly, the tactile feedback layer 208 may be integrated into the cover layer 202, and so forth.

Starting from the top with the cover layer 202, a thin film sheet serves as a unitary fascia member for the electronic device (100). A "fascia" is a covering or housing, which may or may not be detachable, for an electronic device like a mobile telephone. While the drawings herein employ a mobile telephone as an exemplary electronic device for discussion, it will be clear to those of ordinary skill in the art having the benefit of this disclosure that the invention is not so limited. The fascia of the present invention could be used for any electronic device having a display and a keypad.

The cover layer 202, in one exemplary embodiment, is a thin, flexible membrane. Suitable materials for manufacturing the thin, flexible membrane include clear or translucent plastic film, such as 0.4 millimeter, clear polycarbonate film. In another embodiment, the cover layer 202 is manufactured from a thin sheet of reinforced glass. The cover layer, being continuous and without holes or other apertures or perforations, is well suited to serve as a continuous fascia for the electronic device (100), keeping dust, debris and liquids from invading the device. While the cover layer 202 is continuous, for discussion purposes, the cover layer 202 will be colloquially sectioned into a keypad region 106 and a display region 201. The keypad region 106 is the section of the cover layer 202 where user actuation targets, keys, and buttons will be presented, while the display region 201 is the section of the cover layer 202 where the high-resolution display 209 is visible.

Printing may be disposed on the rear face 211. As will be described in more detail below, in one embodiment of the invention, the colored reflective polarizer provides color for the front surface (105) of the electronic device (100). However, even in such an embodiment, selective printing on the cover layer may be desirable. For instance, printing may be desired around the perimeter of the cover layer 202 to cover electrical traces connecting the various layers, or electrodes on certain layers.

Printing may be desired on the front face 213 for various reasons as well. For example, a subtle textural printing or overlay printing may be desirable to provide a translucent matte finish atop the electronic device (100). Such a finish is useful to prevent cosmetic blemishing from sharp objects or fingerprints. By printing only on the rear face 211, however, the front face 213 can remain smooth and glossy. When printing is done on the rear face 211 of the cover layer 202, the printing, being disposed on the inside of the device, is protected from wear and abrasion. There is generally no printing in the display region 201, so the high-resolution display 209 may be easily viewed. Printing about the display region 201 may be desired, however, for the reasons listed above.

The cover layer 202 may also include an ultra-violet barrier. Such a barrier is useful both in improving the visibility of the high-resolution display 209 and in protecting internal components of the electronic device (100).

The user interface 200 also includes a capacitive sensor 203. The capacitive sensor 203, which is formed by depositing small capacitive plate electrodes on a substrate, is configured to detect the presence of an object, such as a user's finger, near to or touching the user interface 200. Control circuitry detects a change in the capacitance of a particular plate combination on the capacitive sensor 203. The capacitive sensor 203 may be used in a general mode, for instance to detect the general proximate position of an object relative to either the keypad region 106 or the display region 201. The capacitive sensor 203 may also be used in a specific mode, where a particular capacitor plate pair may be detected to detect the location of an object along length and width of the front surface (105) of the electronic device (100). In this mode, the capacitive sensor 203 may be used to detect the proximate position of an object, such as a user's finger, relative to any of the actuation targets presented.

Turning to the optical shutter assembly 204, this layer includes a segmented electro-optical device configured as an optical shutter. A "segmented" electro-optical display device is used herein to mean a display device with less granularity than the high-resolution display (101) referred to above. The segmented electro-optical device is capable of actuating a predefined segment or segments to present a predetermined text or symbol graphic to a user, but does not have sufficient granularity to easily transition from, for example, text to graphics. The term "low resolution" is used herein to differentiate the segmented electro-optical device of the optical shutter assembly 204 from the high-resolution display 209. While the high resolution display 209 is configured to actuate individual pixels to present high resolution text or images, the optical shutter assembly 204 uses electrodes placed atop and beneath the segmented electro-optical device to open and close "windows", thereby transforming the window from a first, colored state to a second, translucent state. The optical shutter assembly 204 is "segmented" because individual windows, or shutters, may be controlled. Further, as will be seen in more detail below, by configuring the electrodes on one side of the segmented electro-optical device, each shutter can be configured as the alphanumeric indicia, which may include numbers, letters, or symbols forming images representative of a plurality of actuatable keys. In one embodiment, the alphanumeric indicia may comprise graphics corresponding to a twelve-key telephone keypad.

The optical shutter assembly 204 is configured to present any of a plurality of keypad configurations to a user. Each keypad configuration, in one embodiment, corresponds to a particular mode of operation of the electronic device (100). For example, a music player mode may correspond to a first keypad configuration, while a phone mode may correspond to an alternate configuration. The optical shutter assembly 204 presents each of the plurality of keypad configurations by transitioning segments of the optical shutter assembly 204 from colored states to translucent states. When translucent, light can pass through each shutter. When opaque, a predetermined color is reflected. The result is a reveal and concealment of each individual key. Each key forms an actuation target that can be selected by the user.

A reflective electroluminescent device 205 may be included to provide a backlighting function to the shutters of the optical shutter assembly 204. As used herein, "electroluminescent" refers to any device capable of producing luminescence electrically, including light emitting diodes, and equivalent devices. Such a function is useful in improving the visibility of the keypad region in low-light conditions. In one embodiment, the reflective electroluminescent device 205 includes a layer of backlight material sandwiched between a transparent substrate bearing transparent electrodes on the top and bottom. The electrodes, which may be segmented and patterned to correspond with the shutters of the optical shutter assembly 204. One electrode is an actuation electrode, while another electrode is a ground electrode. Where the electrodes are segmented, the actuation electrode is generally patterned. A reflector, integrated into the back of the reflective electroluminescent device 205 allows incident light to be reflected back through the display, even when the electroluminescent elements are active.

The high resolution display 209, which may have its own lighting system and may also include a polarizing layer 215 configured to polarize light along an axis of polarization, may be placed adjacent to the reflective electroluminescent device 205. In one embodiment, the polarizing layer 215 is aligned with the colored reflective polarizer such that the transmission axis of the polarizing layer 215 is aligned with the transmission axis of the colored reflective polarizer. Further, filler material 210 may be included to complete the assembly.

The resistive switch layer 206 includes a force switch array configured to detect contact with any of one of the shutters dynamic keypad region or any of the plurality of actuation targets. An "array" as used herein refers to a set of at least one switch. For instance, where the cover layer 202 is manufactured from glass, one switch may be all that is necessary. However, when the cover layer 202 is manufactured from thin film plastic, multiple switches may be employed. The array of resistive switches functions as a force-sensing layer, in that when contact is made with the front surface (105), changes in impedance of any of the switches may be detected. The array of switches may be any of resistance sensing switches, membrane switches, force-sensing switches such as piezoelectric switches, or other equivalent types of technology.

When the cover layer 202 is made from thin plastic film, an array of switches may be included on the resistive switch layer to detect the proximate location of a finger actuating one of the keys. Experimental results have shown that a deflection of as little as 40 um along the cover layer is sufficient to actuate one of the resistive switches. When the cover layer 202 is made from glass, the capacitive sensor 203 may be used to detect the proximate location, while one or more switches on the resistive switch layer 206 may be used to detect actuation of the rigid cover layer 202. By employing control circuitry to combine this data, the exact shutter actuated may be properly detected.

A substrate layer 207 is provided to carry the various conduits to control circuits and drivers for the layers of the display. The substrate layer 207, which may be either a rigid layer such as FR4 printed wiring board or a flexible layer such as copper traces printed on a flexible material such as Kapton®, includes electrical connections to components, integrated circuits, processors, and associated circuitry to control the operation of the display. The substrate layer 207 includes a connector 214 for coupling to other electrical components within the electronic device (100).

As noted in the discussion of the resistive switch layer 206 above, in one embodiment a modicum of deflection is all that is required to actuate one of the keys presented by the optical shutter assembly 204. Where the cover layer 202 is manufactured from thin film plastic, a minor deflection of the plastic will actuate a switch on the resistive switch layer 206. Where the cover layer 202 is manufactured from glass, a minor deflection of the entire cover layer 202 will actuate a switch on the resistive switch layer 206. This deflection is on the order of tens of micrometers. As such, a user may not perceive any deflection at all when pressing each key.

To provide tactile feedback, an optional tactile feedback layer 208 may be included. The tactile feedback layer 208 may include a transducer configured to provide a sensory feedback when a switch on the resistive switch layer detects actuation of a key. In one embodiment, the transducer is a piezoelectric transducer configured to apply a mechanical "pop" to the user interface 200 that is strong enough to be detected by the user. Thus, the tactile feedback layer provides sensory feedback to the user, thereby making the smooth, substantially planar user interface 200 react like a conventional keypad without the need of individual popple-enabled keys protruding through the keypad.

Figure 3:
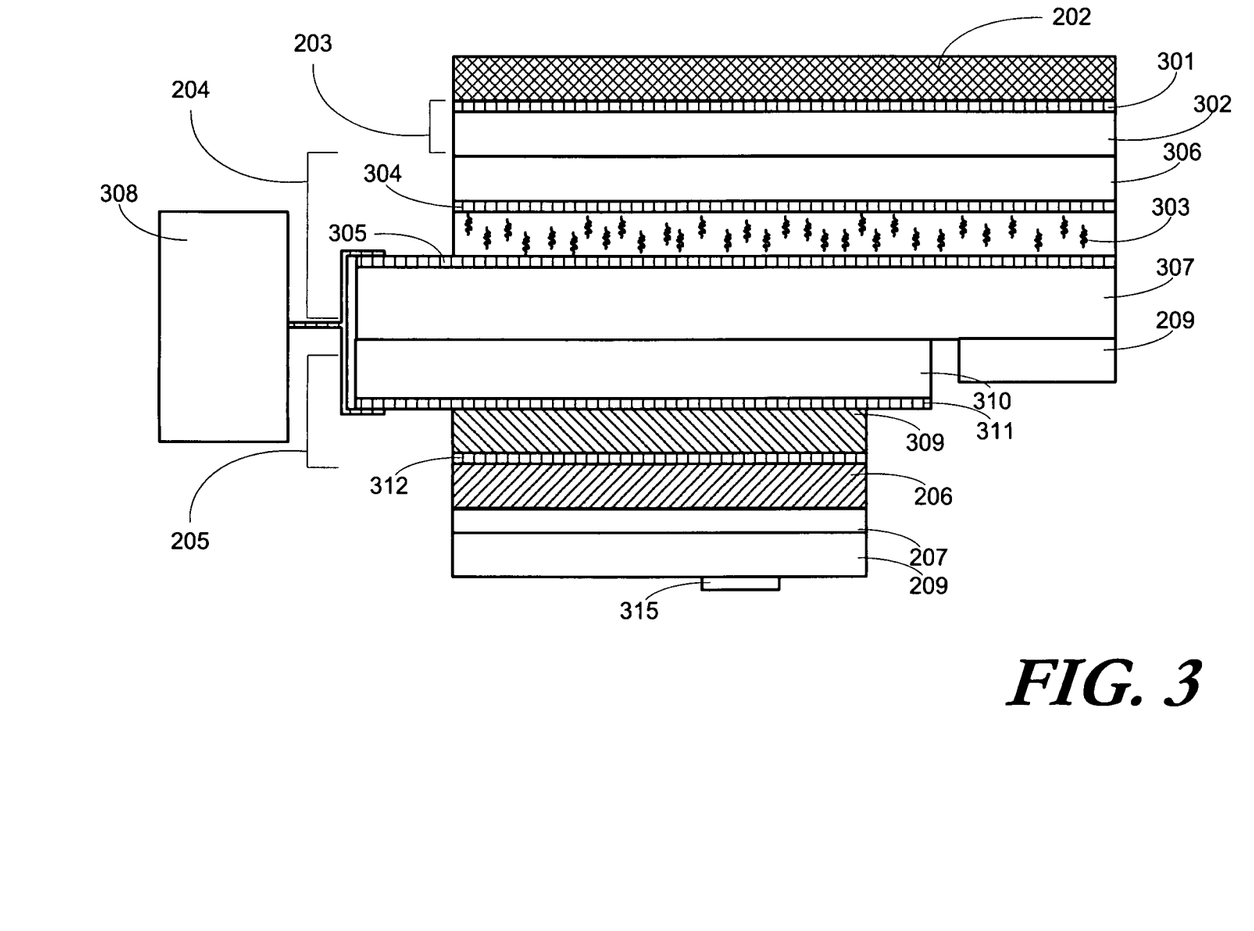
FIG. 3 illustrates a sectional view of one embodiment of a dynamic keypad interface in accordance with the invention

Turning now to FIG. 3, illustrated therein is a side view of the user interface (200) shown in FIG. 2. Each layer may be seen from the side in a cut-away view. Again, it will be clear to those of ordinary skill in the art having the benefit of this disclosure that the invention is not limited to the specific structure shown in FIG. 3. Some layers, as noted above, are optional and may not be included in certain applications.

Note that the layers may be coupled together in any of a variety of ways. One exemplary embodiment of a coupling mechanism is by using a thin layer of clear (transparent), non-conductive adhesive. For instance, the cover layer 202, the capacitive sensor 203, and the optical shutter assembly 204 may each be mechanically coupled together with non-conductive, translucent adhesive. This coupling keeps the overall assembly properly aligned within the device.

When viewing from the top, a user first sees the cover layer 202, which may be either a thin film plastic or glass layer. Where glass is used, reinforced glass is often preferred to provide additional reliability to the user interface (200). The glass may be reinforced by a strengthening process, such as a chemical or heat treatment process. As noted above, the cover layer may include printing disposed thereon.

Next, the capacitive sensor 203 may be seen. The capacitive sensor 203 includes both an electrode layer 301 and substrate layer 302. The substrate layer 302, which may be either rigid, or soft (for instance a silicone layer), carries the electrode plates that form the capacitive sensors. The electrodes may be used in a singular configuration, or in pairs. Further alternate electrode pairs, including electrode groupings of two, four, or six electrodes, may be used to form the capacitive sensors. The electrode layer 301, as will be described in more detail below, may be formed by printing solid indium-tin oxide ($In_2O_3 SnO_2$) (ITO) in the desired capacitor plate patterns atop the substrate layer 302. Other materials, including patterned conductive inks, may also utilized in the electrode construction.

Next, the optical shutter assembly 204 may be seen. In one embodiment, the segmented electro-optical device of the optical shutter assembly 204 is manufactured using a twisted nematic liquid crystal display material. This material will be discussed herein as an exemplary embodiment. However, it will be clear to those of ordinary skill in the art having the benefit of this disclosure that the invention is not so limited. Other materials, including polymer-dispersed liquid crystal material, super twisted nematic liquid crystal material, ferroelectric liquid crystal material, electrically-controlled birefringent material, optically-compensated bend mode material, guest-host materials, and other types of light modulating may equally be used.

The optical shutter assembly 204 includes twisted nematic liquid crystal display material 303 that is sandwiched between two electrodes 304,305 and two substrates 306,307. The electrodes 304,305 and substrates 306,307 are preferably transparent, such that light can pass freely through each. The substrates 306,307 may be manufactured from either plastic or glass. The upper electrode 304 is constructed, in one embodiment using indium-tin oxide affixed to substrate 306. The lower electrode 305 is constructed using a patterned indium-tin oxide layer affixed to the lower substrate 307. In one embodiment, the patterns are those of alphanumeric keys or symbols representing keys or user actuation targets of the device. Where it suits the particular design or application, both electrodes 304,305 can be patterned; however, user visibility may be affected where both electrodes 304,305 are patterned. The patterned electrode(s) 305, by way of patterned electrical traces, is connected to a control circuit 308. The control circuit 308 applies a field to the patterned electrode(s) 305, while the other electrode 304 acts as a ground. The direction of the electric field is not important to the optical shutter assembly 204, thus either electrode can act as the ground.

The electric field applied, as will be described in more detail below, alters the light transmission properties of the twisted nematic liquid crystal display material 303. The electric field can cause sections under each of the patterned electrodes 305 to transition from a first state to a second state. By way of example, the first state may be opaque, while the second state is translucent. The patterns of the patterned electrodes 305 define the images of each shutter in the optical shutter. By way of example, a shutter can be patterned as a "9 key" for a phone by patterning one electrode as a box (i.e. the boundary of the key), and another electrode as the "9 wxyz" characters. The shutters thus act as "windows" that can be open or closed, to reveal or hide images.

The optical shutter assembly 204, as will be described in more detail below, also includes multiple polarizing layers disposed atop and beneath the optical shutter. These polarizing layers, which include the colored reflective polarizer, polarize light along a polarization axis and provide a predetermined color to the overall display assembly.

The reflective electroluminescent device 205 includes a layer of electroluminescent material 309 sandwiched between a transparent substrate 310 bearing a single, or patterned, indium tin oxide electrode(s) 311 and a ground electrode 312. In one embodiment, the patterned electrode 311 of the reflective electroluminescent device 205 is aligned with the various shutters of the optical shutter assembly 204. In such an embodiment, the ground electrode 312 may comprise a solid conductive ink layer printed on the bottom surface of the electroluminescent material 309. This solid conductive ink layer may have reflective properties. Alternatively, the reflective electroluminescent device 205 may have a reflective layer integrated beneath the ground electrode 312. Also, the ground electrode 312 may be patterned and may be borne on a reflective substrate if desired. One electrode layer 301 is connected to control circuitry 308. Like the optical shutter assembly 204, either electrode layer 311,312 can act as the ground.

In one embodiment, the high-resolution display 209 is disposed at least partially under the optical shutter assembly 204. In such an embodiment, the optical shutter assembly 204 passes beneath the display region (201), thereby covering at least a portion of the high-resolution display 209. Thus, when a shutter above the high-resolution display 209 closes, the high-resolution display 209 is completely hidden. This action gives the overall device (100) a "blank" face of a predetermined color when the electronic device (100) is OFF. Beneath the reflective electroluminescent device 205 are the resistive switch layer 206, the substrate layer 207, and the tactile feedback layer 208 with its transducer 315.

Figure 4:
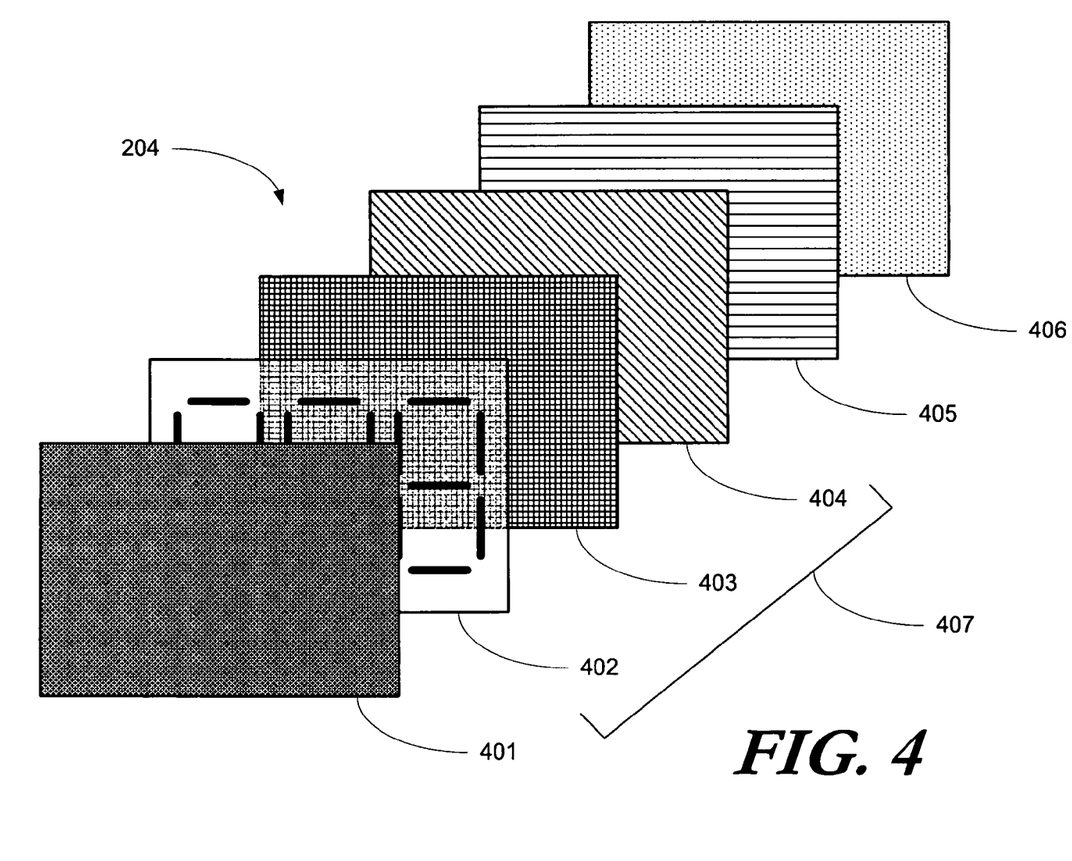
FIG. 4 illustrates an exploded view of a twisted nematic liquid crystal display in accordance with one embodiment of the invention.

Turning now to FIG. 4, illustrated therein is an exploded view of an optical shutter assembly 204 for a portable electronic device (100) in accordance with the invention. The optical shutter assembly 204 of FIG. 4 is configured to selectively present one of a plurality of keypad configurations to a user.

The optical shutter assembly 204, in one embodiment, employs a twisted-nematic liquid crystal segmented electro-optical device 407. This segmented electro-optical device 407 is referred to as "twisted" because it contains liquid crystal elements that twist and untwist in differing amounts to alter the polarization of light passing through.

A first polarizer 401 is disposed on a first side of the segmented electro-optical device 407. The first polarizer 401 is configured to polarize incident light along an axis of polarization. Stated differently, light polarized along one axis passes through the first polarizer 401, while light polarized along a second axis is absorbed.

The segmented electro-optical device 407 includes a pair of substrates. A first substrate 402, having indium tin oxide electrodes (as previously discussed) printed in varying shapes is disposed adjacent to the first polarizer 401. The electrodes may be disposed in shapes that correspond to the alphanumeric keys or symbols associated with the keys of the electronic device (100).

Twisted nematic liquid crystal material 403 is next, followed by another substrate 404 configured with ground electrodes. Where no voltage is applied to the electrodes, the optical shutter assembly 204 is in a first state. When voltage is applied the liquid crystal material twists—in incremental amounts up to 90 degrees—thereby changing the luminous polarization of light passing through the twisted nematic liquid crystal material 403. The twisted nematic liquid crystal material 403 thus acts as a controllable polarizer, controlled by electrical signals applied to the electrodes. Adjustment of the voltage being applied to the electrodes permits varying levels polarization axis rotation. Embodiments of the present invention use this device as a low-resolution display to reveal and hide keys.

A colored reflective polarizer 405 is disposed on a second side of the segmented electro-optical device 407, opposite the first polarizer 401. The colored reflective polarizer 405 is configured to reflect a predetermined color of light polarized along a first axis, and to transmit light polarized along a second axis. In one embodiment, the colored reflective polarizer 405 is made of two layers: a colored dichroic polarizer layer and a reflective polarizer layer. The colored dichroic polarizer is configured to absorb light of a certain wavelength range polarized along a first axis, while passing through light of a certain wavelength range polarized along that axis. The colored dichroic polarizer is also configured transmit light polarized along a second axis.

By way of example, consider light polarized along a first axis, P1, and light polarized along a second axis, P2. The colored dichroic polarizer may will absorb most P1 light, while still passing a certain wavelength range—or color—through. All light polarized along the second axis, P2, will pass through the colored dichroic polarizer. When the segmented electro-optical device 407 is used with the colored reflective polarizer 405 in accordance with embodiments of the invention, the "twisting" of the segmented electro-optical device 407 is used to facilitate the reflection of predetermined color from the colored reflective polarizer 405. In so doing, the colored dichroic polarizer "looks" a predetermined color to the user. The reflective polarizer is configured to reflect light polarized along a first axis and to transmit light polarized along a second axis.

A second polarizer 406 is disposed adjacent to the colored reflective polarizer 405 and opposite the segmented electro-optical device 407. The second polarizer 406 operates in similar fashion to the first polarizer 401, in that light polarized along one axis is absorbed while light polarized along another axis passes through. In one embodiment, the second polarizer 406 has a polarization transmission axis that is substantially orthogonal with a transmission axis of the first polarizer 401.

Figure 5:
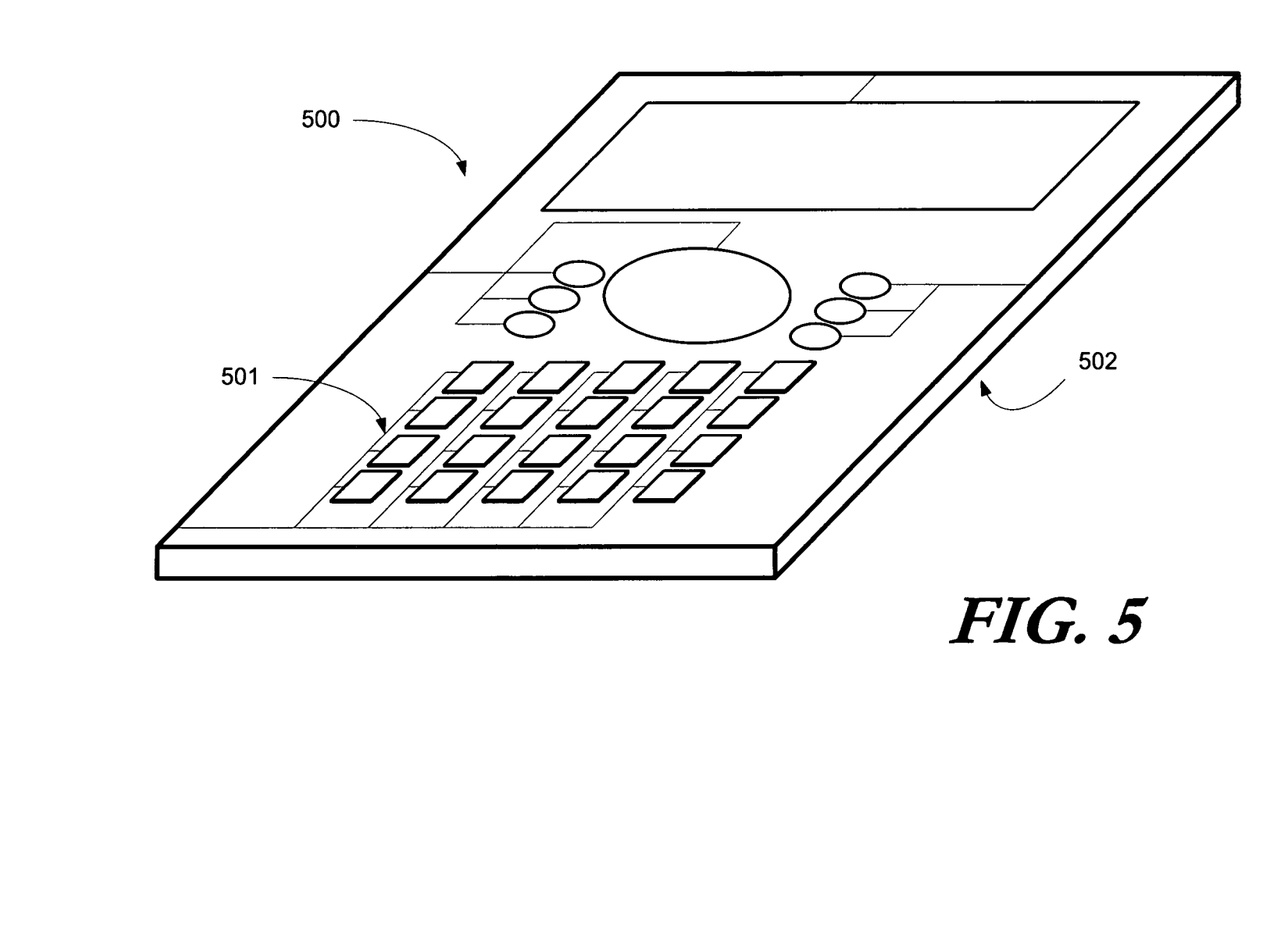
FIG. 5 illustrates a segmented electroluminescent device in accordance with one embodiment of the invention.

Turning now to FIG. 5, illustrated therein is one embodiment of a reflective electroluminescent device 205, or reflective light source, in accordance with embodiments of the invention. The reflective electroluminescent device 205 includes patterned electrodes 501 that are positioned to correspond to the shutters of the optical shutter assembly (204). By using patterned electrodes 501, light segments may be selectively actuated. In other words, when the each shutter is actuated to transition from an opaque state to a translucent state, a corresponding patterned electrode, and thus a corresponding electroluminescent cell, is actuated so as to project light through the actuated segment. By actuating selective patterned electrodes 501, only those corresponding to open shutters are actuated, thereby reducing overall power consumption of the electronic device (100).

The reflective electroluminescent device 205 may also include a reflective layer 502 coupled thereto. For instance, the reflective layer 502 may be disposed beneath the electroluminescent device. Alternatively, the reflective layer 502 may be integrated within the electroluminescent device.

Figure 6:
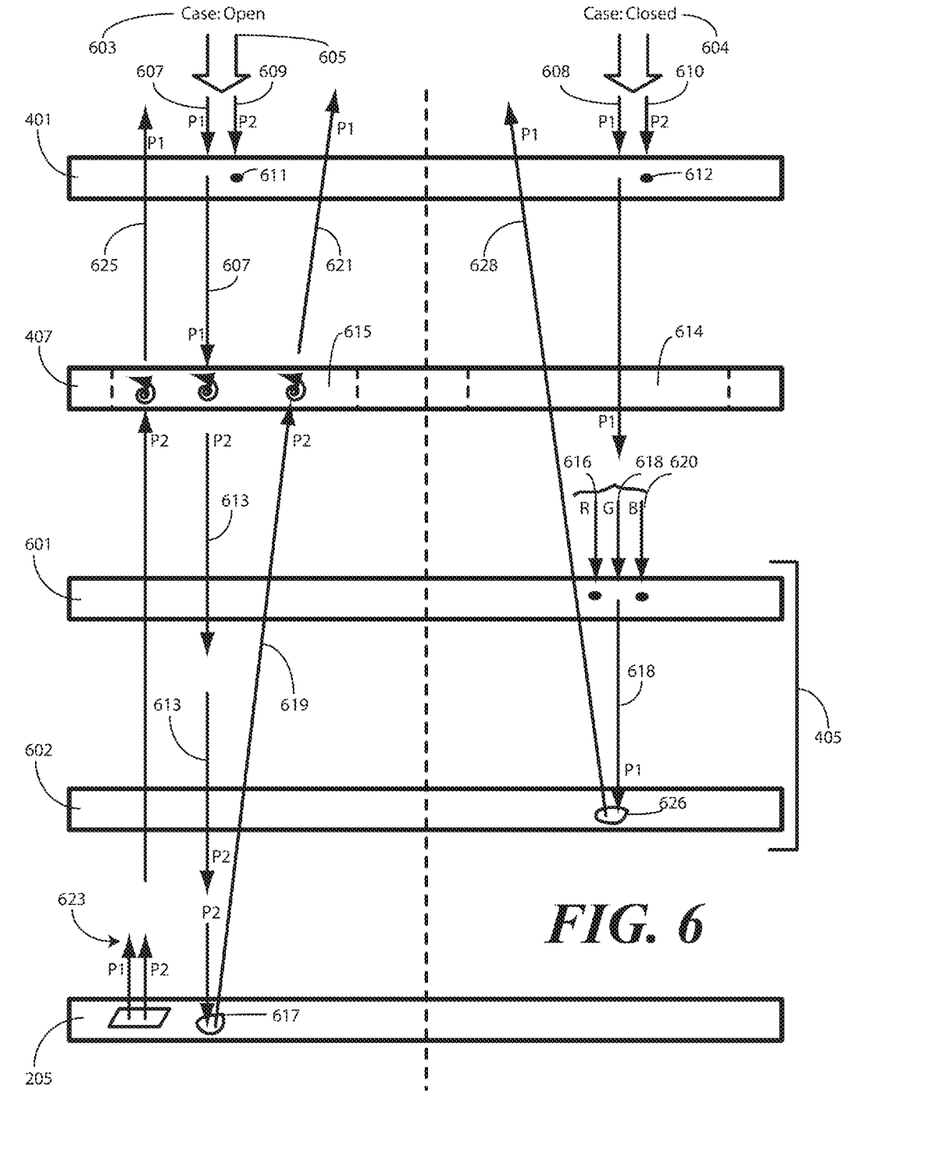
FIG. 6 illustrates one embodiment of a colored dynamic keypad interface in accordance with embodiments of the invention.

Turning to FIG. 6, illustrated therein is the operation of an optical shutter assembly (204) in accordance with embodiments of the invention. Two cases 603,604 are illustrated in FIG. 6. The first case, case 603, is where the segmented electro-optical device 407 has segments "open". Case 604 is where no segments of the segmented electro-optical device 407 are open.

Beginning with case 603, incident light 605 is represented as having a component of light 607 polarized along a first axis, P1, and a component of light 609 polarized along a second axis, P2. The first polarizer 401 is configured to absorb light polarized along axis P2, and to pass light polarized along P1. Thus, light 609 is absorbed at point 611, while light 607 passes through the first polarizer 401.

Segment 615 of the segmented electro-optical device 407 is open. This means that the segmented electro-optical device 407 causes the polarization axis of incident light to rotate. In one embodiment, this rotation is 90 degrees. Thus, incident light 607, polarized along axis P1, becomes light 613, polarized along axis P2, upon leaving the segmented electro-optical device 407.

The colored reflective polarizer 405, shown in FIG. 6 comprising a colored dichroic polarizer 601 and a reflective polarizer 602, is configured to pass light polarized along one axis of polarization. As this transmission axis of the colored dichroic polarizer 601 is substantially orthogonal with that of the first polarizer 401, light 613 passes through the colored dichroic polarizer 601. Similarly, light 613 passes through the reflective polarizer 602.

When light 613 reaches the reflective electroluminescent device 205, it is reflected at point 617 off of the reflective component of the reflective electroluminescent device 205. The reflected light 619, having the same polarization P2, then passes back through all the layers, rotating as it passes through the segmented electro-optical layer 407. Similarly, light 623 originating at the reflective electroluminescent device 205, which may have both P1 and P2 components, passes through the reflective polarizer with polarization P2. This light then is able to pass through the other layers in a manner similar to that of light 619.

Turning to case 604, the presentation of a predetermined color may be more clearly illustrated. As with case 603, incident light 606 is represented as having a component of light 608 polarized along a first axis, P1, and a component of light 610 polarized along a second axis, P2. As noted with case 603, the first polarizer 401 is configured to absorb light polarized along axis P2, and to pass light polarized along P1. Thus, light 610 is absorbed at point 612, while light 608 passes through the first polarizer 401.

In case 604, the applicable segment 614 is in the "closed" state. As such, light 608 passes through the segment 614 without any polarization rotation. For the purposes of discussion, light 608 is illustrated as having three color components, red, green, and blue. The red component is represented by light 616, the green component by light 618, and the blue component by light 620. These components combine to make "white" light. The components are illustrated separately in FIG. 6 to illustrate the operation of the colored reflective polarizer 405.

The colored reflective polarizer 405 operates as a polarization dependent reflective layer in that it is configured to transmit only a color of light of a first polarization (absorbing other colors), and to transmit all colors of light of a second polarization. Looking more particularly at the colored dichroic polarizer 601, the colored dichroic polarizer 601 is a polarizer configured to absorb light polarized in a predetermined direction and predetermined visible range of wavelength. Light polarized in a direction different from the predetermined direction transmits through the colored dichroic polarizer 601. The colored dichroic polarizer 601 also transmits light with wavelength outside of the predetermined visible range.

Thus, presuming for discussion purposes that the colored dichroic polarizer 601 is a "green" polarizer, light 616 will be absorbed at point 622. Similarly, light 620 will be absorbed at point 624. Light 618, the green component, will pass through the colored dichroic polarizer.

The reflective polarizer 602 reflects light polarized in a first direction and transmits light polarized in a second direction. The first and the second direction are essentially orthogonal to each other. In case 603, it was seen that light 613, polarized along axis P2, transmitted through the reflective polarizer 602. In case 604, light 618, the green component polarized along P1, reflects off the reflective polarizer 602 at point 626 as light 628. Since light 628 has the same P1 polarization, it passes through the colored dichroic polarizer 601, the segmented electro-optical device 407 and the first polarizer 401.

The user sees light 628 as the color green, thereby making the overall device look green. Thus, as illustrated, in case 604, representing a first state, the user interface of the device is configured to reflect a predetermined color by way of a polarization dependent reflector configured to reflect a predetermined polarization of incident light when in the first state. When the device is in a second state, represented by case 603, the user interface presents one of a plurality of mode based keys by selectively actuating the shutters of the electro-optical device. The device may transition between the first and second states, by way of example, when the capacitive sensor or proximity detector detects an object within a predetermined distance of the device.

Recall from the above that in one embodiment, the segmented electro-optical device 407 spans not only the keypad region (106), but the high-resolution display (209) as well. In such an embodiment, when the device is active, a shutter above the high-resolution display (209) opens so that the user may view the high-resolution display (209). In such an embodiment, when the device is in the first state, the user interface appears blank and has a color corresponding to the configuration of the colored dichroic polarizer 601. In the second state, both user actuation targets and the high resolution display (209) become visible.

Figure 7:
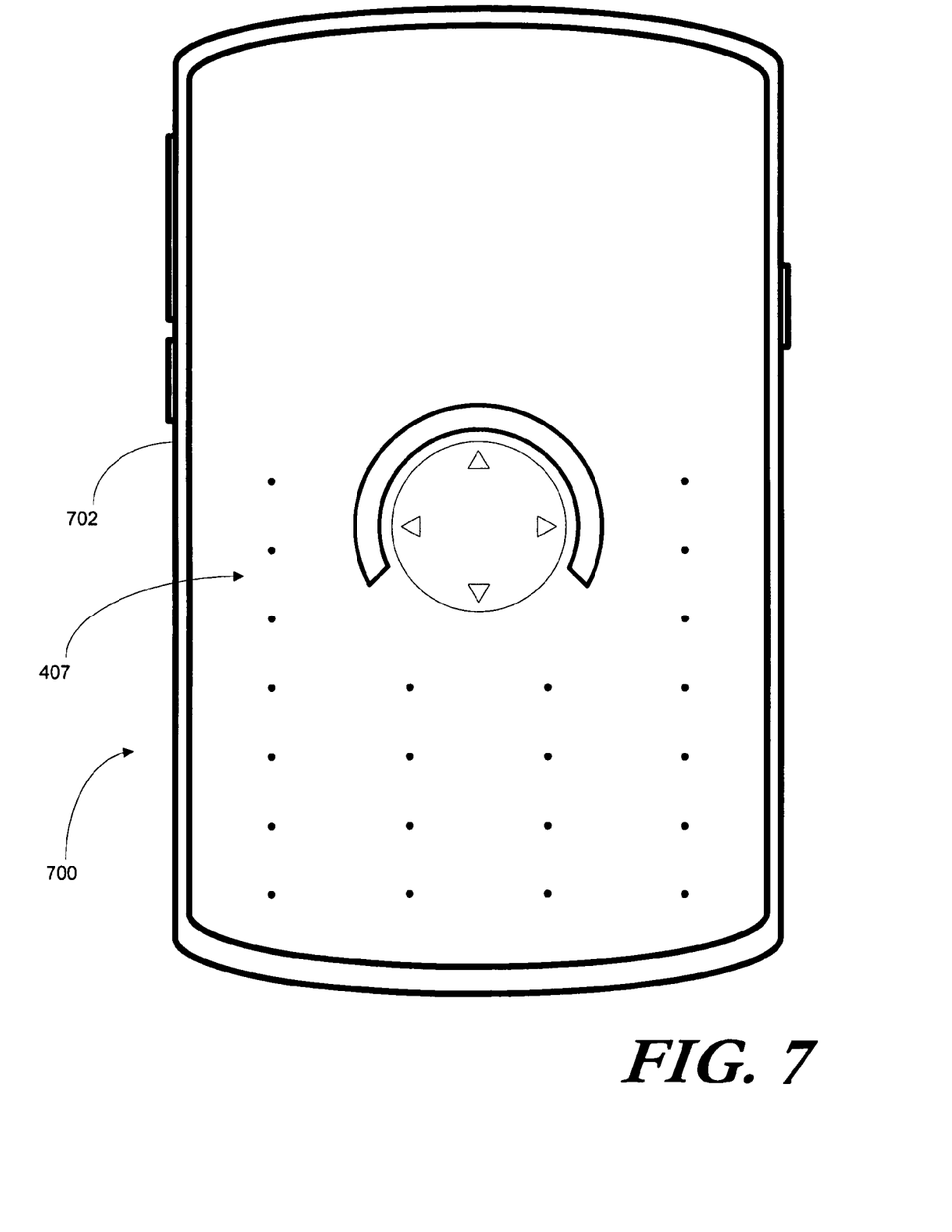
FIG. 7 illustrates an exemplary multimodal device in an OFF or low-power state in accordance with one embodiment of the invention.

Turning now to FIG. 7, illustrated therein is an electronic device 700 employing a user interface in accordance with embodiments of the invention. The electronic device is in the first state, which may be an OFF or low-power mode. When the segmented electro-optical device 407 covers both the keypad region (106) and the high-resolution display (209), the dynamic user interface surface 702 of the electronic device 700 will be blank and have a predetermined color. This occurs because each of the shutters is closed, thereby causing a predetermined color of light to pass through the colored dichroic polarizer (601) and to reflect off the reflective polarizer (602).

Figure 8:
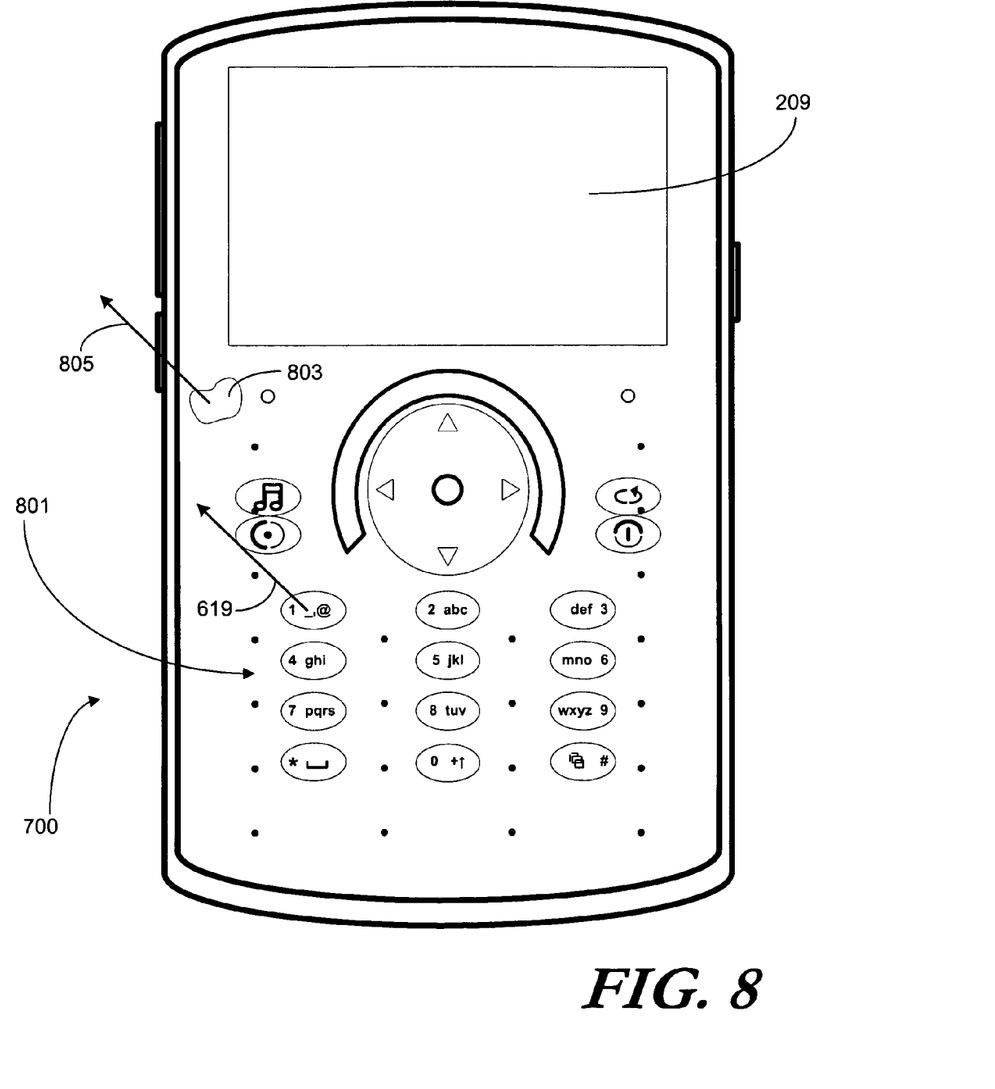
FIG. 8 illustrates an exemplary multimodal device in a telephone mode in accordance with one embodiment of the invention.

Turning now to FIG. 8, illustrated therein is the electronic device 700 having changed from the OFF state (or alternatively the low power state) to an ON state. The ON state may be one of any of a variety of modes, including a radiotelephone mode, a navigational mode, a gaming mode, a music player mode, a video player mode, a picture display mode, a text capture mode, a picture capture mode, or a video capture mode. The electronic device 700 may be converted from the OFF or low power mode to an ON mode in one of a variety of ways. A first method, as noted above, is for a user to actuate the proximity sensor. A second method is from an external event, such as an incoming call or message. When transitioning from the OFF state or low power state to the ON state, the electronic device 700 opens at least one display segment of the segmented optical shutter device 801, thereby transitioning that segment from a predetermined color to the translucent state.

In the ON state, light 619 originates from the reflective electroluminescent device (205) and passes through the segment 801. Similarly, incident light may be reflected from the reflective electroluminescent device (205) through the segment 801. Other portions of the device, such as region 803, may still reflect the predetermined color 805. The high-resolution display 209 may also become visible.

As illustrated and described, embodiments of the invention include a user interface for receiving touch input. In one embodiment, the user interface includes a first polarizer cover layer and a liquid crystal segmented electro-optical layer. The liquid crystal material is disposed between a first and second substrate, and is configured to selectively alter a polarization of light transmitted therethrough. Transparent electrodes disposed on one of the substrates are configured to selectively present one of a plurality of keypad configurations to a user.

A colored reflective polarizer, operating as a polarization dependent reflective layer, is disposed beneath the segmented electro-optical layer. The colored reflective polarizer is configured to reflect a color of light of a first polarization and to transmit light of a second polarization.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. An electronic device having a user interface for receiving a touch input, the user interface comprising:
   a first polarizer cover layer;
   a liquid crystal layer disposed beneath the first polarizer cover layer and between a first and second substrate and configured to selectively alter a polarization of light transmitted therethrough;
   a polarization dependent reflective layer disposed beneath the liquid crystal layer and configured to reflect one of a red component of the transmitted light, a blue component of the transmitted light, or a green component of the transmitted light of a first polarization along a first axis and to absorb all of the components of light of the first polarization that are not reflected, and to transmit each of the red, blue, and green components of light of a second polarization along a second axis, wherein the red, green, and blue components of the transmitted light, when combined, make white light; and
   transparent electrodes disposed on one of the first or second substrate and configured to present a first one of a plurality of keypad configurations to a user when the red, blue, or green component of transmitted light is reflected by the polarization dependent reflective layer and to present a second one of a plurality of keypad configurations to the user when each of the red, green, and blue components are transmitted by the polarization dependent reflective layer.

2. The electronic device of claim 1, further comprising an electroluminescent device having a plurality of selectively lightable segments configured to align with the transparent electrodes.

3. The electronic device of claim 2, wherein the electroluminescent device comprises a reflector coupled thereto configured to reflect incident light.

4. The electronic device of claim 2, wherein the liquid crystal layer comprises a twisted nematic liquid crystal display configured to, in a first state, facilitate a reflection of the color of light of the first polarization from the polarization dependent reflective layer.

5. The electronic device of claim 1, wherein the transparent electrodes comprise selectively actuatable segments configured to create a plurality of user actuation targets by transitioning from a first state to a second state.

6. The electronic device of claim 5, further comprising a proximity detector configured to actuate the transparent electrodes.

7. The multimodal electronic device of claim 1, wherein the multimodal electronic device comprises a radiotelephone.

8. The electronic device of claim 1, wherein the polarization dependent reflective layer comprises a colored reflective polarizer and a reflector.

9. The electronic device of claim 8, wherein the colored reflective polarizer comprises a colored dichroic polarizer configured to absorb light polarized along the first axis and to transmit light polarized along the second axis.

10. The electronic device of claim 8, wherein the reflector is configured to reflect light polarized along the first axis and to transmit light polarized along the second axis.

11. The electronic device of claim 1, wherein the polarization dependent reflective layer further comprises a second polarizer disposed adjacent to the polarization dependent reflective layer, the second polarizer having a second polarizer transmission axis substantially aligned with the first polarizer cover layer.

12. The electronic device of claim 1, wherein the first keypad configuration corresponds to a first mode of operation of the electronic device, and wherein the second keypad configuration corresponds to a second mode of operation of the electronic device.

13. The electronic device of claim 1, wherein the first keypad configuration corresponds to a music player mode of operation of the electronic device, and wherein the second keypad configuration corresponds to a phone mode of operation of the electronic device.

14. A method of selectively revealing one of a plurality of keypad configurations of a user interface of an electronic device while selectively hiding another one of the plurality of the keypad configurations, the electronic device having a polarization dependent reflective layer for reflecting a predetermined color component of light from a user interface, the method comprising:
   transmitting white light through a first polarizer cover layer above the polarization dependent reflective layer;
   reflecting from the polarization dependent reflective layer only one color of transmitted light having a first polarization along a first axis while absorbing other colors of the transmitted light having the first polarization along the first axis;
   altering an axis of polarization of the light transmitted through a liquid crystal layer disposed between the first polarizer cover layer and the polarization dependent reflective layer from a first polarization;
   transmitting through the polarization dependent reflective layer at least three colors of light having a second polarization along a second axis that is different from the first axis;
   when the only one color of light having the first polarization is reflected from the polarization dependent reflective layer, actuating one or more transparent electrodes disposed on a substrate to present a first keypad configuration to a user; and
   when the at least three colors of light having the second polarization are transmitted through the polarization dependent reflective layer, actuating one or more transparent electrodes disposed on a substrate to present a second keypad configuration to a user.

15. The method of claim 14, further comprising detecting an object proximately located with the user interface with a proximity detector.

16. The method of claim 15, wherein the actuating the one or more transparent electrodes occurs in response to the detecting the object proximately located with the user interface.

17. The method of claim 14, further comprising projecting light from an electroluminescent device through one or more user actuation targets on the second keypad configuration.

18. The method of claim 17, wherein projecting the light comprises actuating one or more selectively actuatable segments of the electroluminescent device.

19. The method of claim 14, further comprising revealing a high resolution display disposed beneath the polarization dependent reflective layer.

20. An electronic device having a user interface for receiving a touch input, the user interface comprising:
- a first polarizer cover layer;
- a liquid crystal layer disposed beneath the first polarizer cover layer and between a first and second substrate and configured to selectively alter a polarization of white light transmitted therethrough;
- a polarization dependent reflective layer disposed beneath the liquid crystal layer and configured to reflect a color component of the transmitted white light having a first polarization along a first axis and to absorb all of other color components of the transmitted while light having the first polarization, and to transmit all of the transmitted white light having a second polarization along a second axis that is different from the first axis; and
- transparent electrodes disposed on one of the first or second substrate and configured to present a first one of a plurality of keypad configurations to a user when the red, blue, or green component of transmitted light is reflected by the polarization dependent reflective layer and to present a second one of a plurality of keypad configurations to the user when each of the red, green, and blue components are transmitted by the polarization dependent reflective layer.

* * * * *